United States Patent

[11] 3,603,762

| [72] | Inventor | Steve Spisak<br>Elyria, Ohio |
|---|---|---|
| [21] | Appl. No. | 547,977 |
| [22] | Filed | May 5, 1966 |
| [23] | | Division of Ser. No. 358,736, Apr. 10, 1964, Pat. No. 3,525,846 |
| [45] | Patented | Sept. 7, 1971 |
| [73] | Assignee | TRW Inc.<br>Cleveland, Ohio |

[54] STUD-WELDING TOOL AND STUD-LOADING DEVICE THEREFOR
1 Claim, 14 Drawing Figs.

[52] U.S. Cl. .................................................. 219/98
[51] Int. Cl. .................................................. B23k 9/20

[50] Field of Search .......................................... 219/98, 99

[56] References Cited
UNITED STATES PATENTS

| 2,537,989 | 1/1951 | Graham | 219/78 |
| 3,299,248 | 1/1967 | Meyer | 219/98 |

FOREIGN PATENTS

| 931,557 | 8/1955 | Germany | 219/98 |

*Primary Examiner*—R. F. Staubly
*Attorneys*—Philip E. Parker, James R. O'Connor, John Todd, Hall & Houghton and Gordon Needleman

ABSTRACT: A system for feeding small studs to a chuck of a stud-welding tool is provided. The stud-welding tool has a chamber behind the chuck into which the studs are fed. A plunger then moves the studs from the chamber into the chuck from the rear.

INVENTOR
STEVE SPISAK

INVENTOR.
STEVE SPISAK
BY
ATTORNEYS

INVENTOR.
STEVE SPISAK

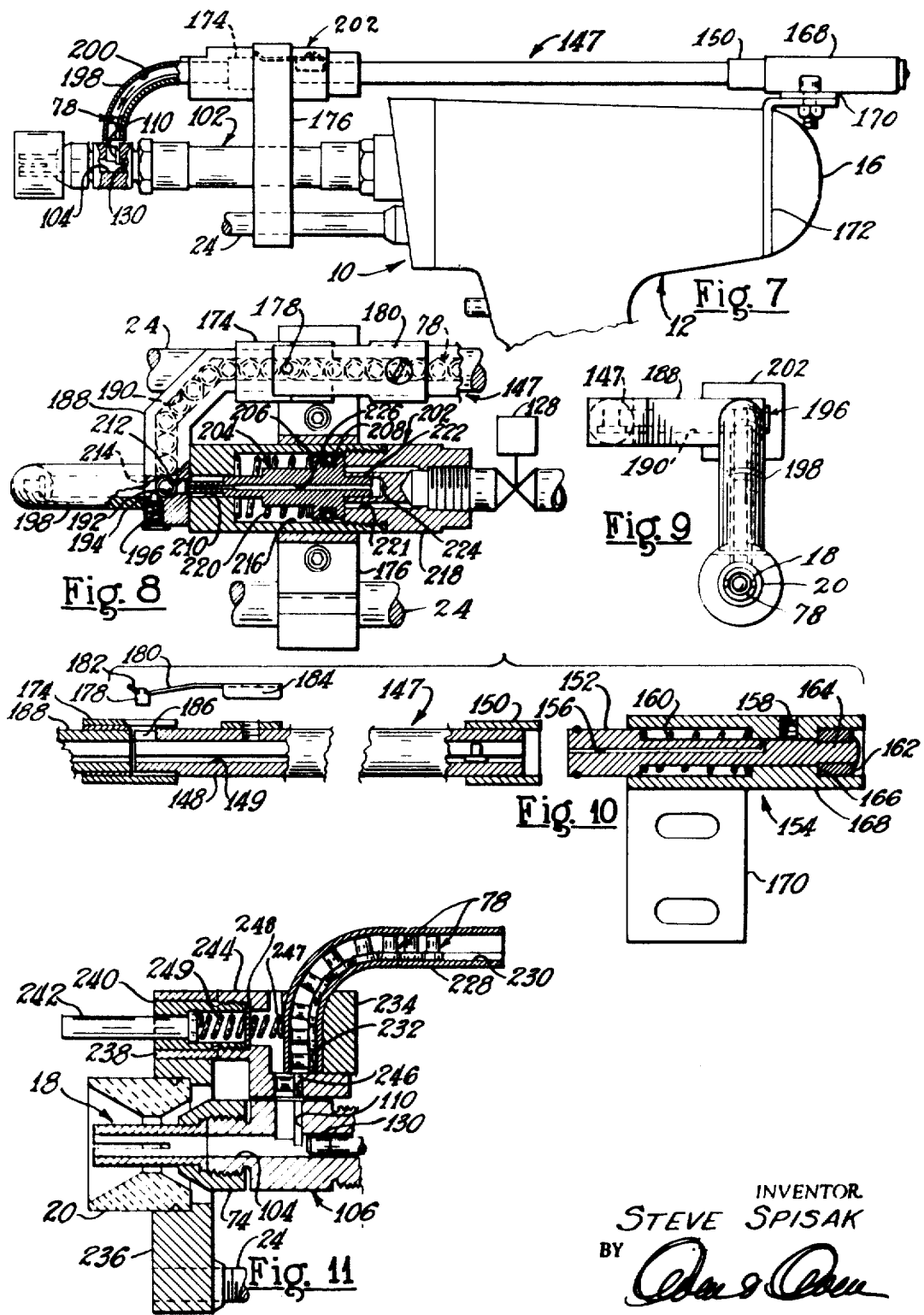

INVENTOR.
STEVE SPISAK
BY
ATTORNEYS

STUD-WELDING TOOL AND STUD-LOADING DEVICE THEREFOR

This application is a division of Ser. No. 358,736 filed Apr. 10, 1964 now U.S. Pat. No. 3,525,846, issued Aug. 25, 1970.

This invention relates to a stud-welding tool and more particularly to a stud-loading tool for end welding studs and to a loading device for automatically feeding studs to a chuck of the welding tool.

Stud-welding tools for end welding various types of studs to workpieces are now in common use. In the operation of this type of tool, the loading of the stud can be time consuming. The stud first must be grasped by the operator, then oriented to a predetermined position, aligned with the chuck of the welding tool which is to hold the stud during welding, and finally inserted into the chuck. The studs preferably are arc-welded by the technique disclosed in Nelson U.S. Pat. No. 2,191,494 or Glorioso U.S. Pat. No. 3,136,800. However, the studs also can be welded by the technique disclosed in Graham U.S. Pat. No. 2,610,278, for example, or by resistance welding.

Arc welding is particularly advantageous for welding small studs. In one commonly used arc-welding cycle performed with an arc-welding tool, the stud is first pressed against the workpiece to place it in good electrical contact therewith and a trigger of the tool is then pulled to cause the stud to be withdrawn from the workpiece to a retracted position. The stud is held in the retracted position for a short period of time, after which the stud is plunged against the workpiece. Frequently, a pilot arc is first initiated as the stud is withdrawn, after which a main welding arc is automatically struck. The main welding arc is struck while the stud is retracted or as it begins its plunge, thereby forming small pools of molten metal on the end of the stud and on the workpiece at the point where the stud is to be affixed. The two pools of molten metal solidify after the plunge to complete the weld. The tool is then manually withdrawn with the now-welded stud separated from the chuck.

In the overall welding cycle or operation, the time required to load the stud in the chuck may be several times longer than the time required for the actual welding, the latter usually being less than a second or two. This is particularly true for smaller studs which may have a length of a fraction of an inch, one-quarter inch, for example, and which are particularly difficult to handle. Hence, a reduction in the loading time can substantially reduce the time for the overall welding operation. When a large number of studs are to be welded, even a small reduction in the time required for each weld can make a substantial difference in the overall time required to complete a particular part or a particular welding application.

The present invention relates to a stud-welding tool and a loading device for simplifying and increasing the rate of loading of studs into the chuck of the welding tool. The loader according to the invention includes a source of supply of studs and means for sequentially moving the studs into a loading passage aligned with the chuck. A piston is located in the passage behind the chuck with the piston serving both to move the stud forwardly into the chuck and to hold it in position in the chuck during the welding operation. The piston is located at the forward end of the welding tool but behind the chuck and is powered by means located externally of the tool and also at the forward end thereof. By locating the components of the loading device behind the chuck, they are always out of the way of the chuck during the welding operation and need not be moved out of the way before each welding cycle can begin. In the preferred form, the piston is pneumatically operated but also can be electrically operated or operated by hand.

It is, therefore, a principal object of the invention to provide a loading device for facilitating the loading of studs into the chuck of a welding tool from a position behind the chuck.

Another object of the invention is to provide a loading device for a stud-welding tool having automatic feed means and an improved supply source of studs further improving the rate and reliability of loading.

Other objects and advantages of the invention will be apparent from the following detailed description of a preferred embodiment thereof, reference being made to the accompanying drawing, in which:

FIG. 7 is a fragmentary view in elevation, with parts broken away and with parts in cross section, of a stud-welding tool similar to that of FIG. 1 and employing a slightly modified stud-loading device;

FIG. 8 is an enlarged, fragmentary, plan view, with parts broken away and with parts in cross section, of the loading device of FIG. 7;

FIG. 9 is a front view of part of the loading device of FIGS. 7 and 8;

FIG. 10 is an enlarged, exploded, fragmentary view, with parts broken away and with parts in cross section, of a magazine of the loading device shown in FIG. 7;

FIG. 11 is a view in vertical cross section of part of a modified stud-loading device embodying the invention;

Figure 1:
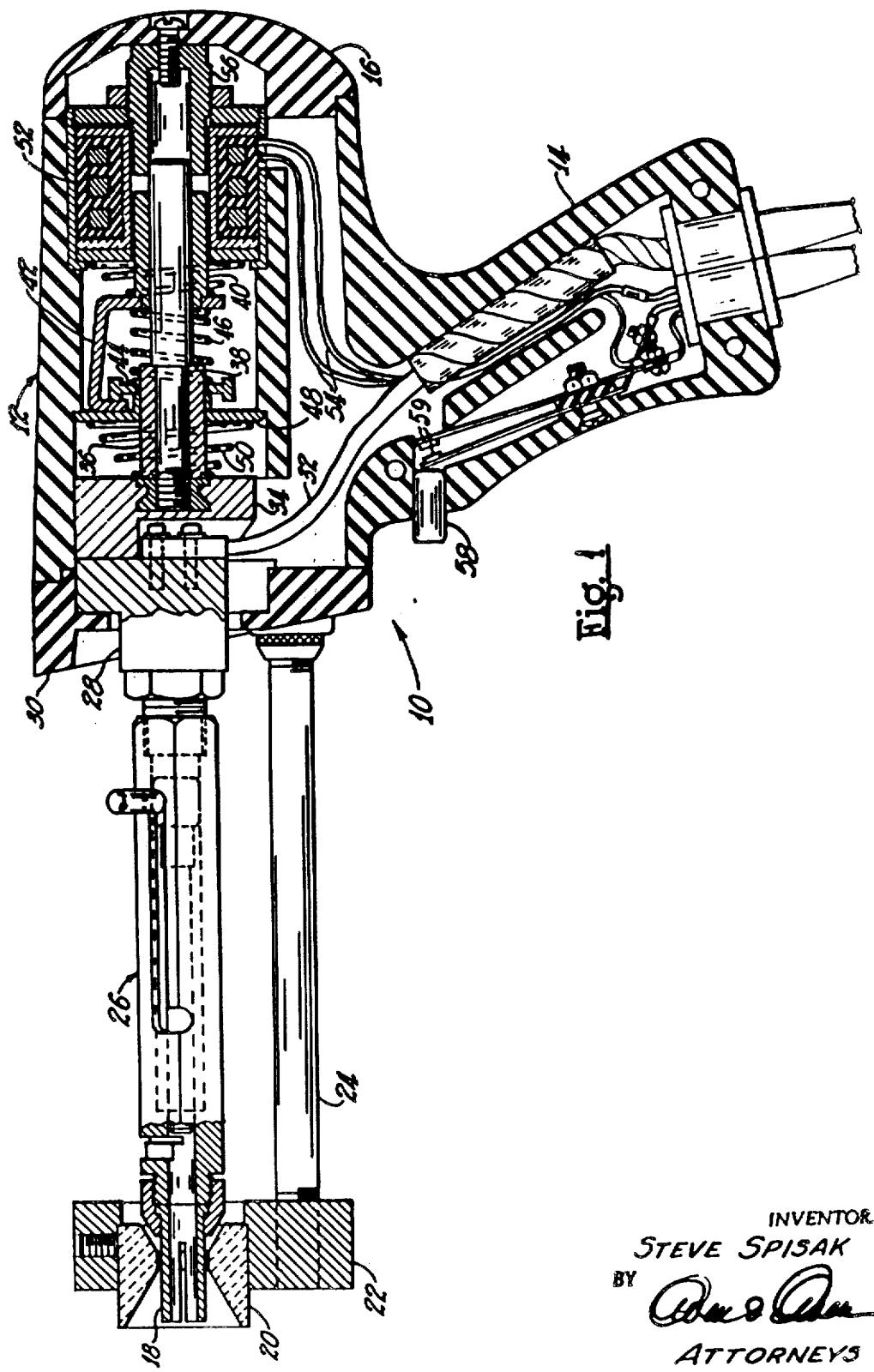
FIG. 1 is a view in longitudinal, vertical cross section of a welding tool embodying one form of the invention.

Referring to the drawings and particularly to FIG. 1, a welding tool 10 can be of a number of suitable types. When the tool 10 is used to weld a stud by a drawn arc method, it includes means for retracting a stud from a surface or workpiece, means for holding the stud in the retracted position for a predetermined period, and means for moving the stud toward and against the workpiece at the end of the predetermined period. The stud welding tool 10 includes a main body or housing 12 of suitable dielectric material, the body having an integral pistol grip 14 and a separable rear end cap 16. A chuck 18 is located at the front of the tool 10 and holds a stud during the welding operation. The chuck 18 in this instance is surrounded by a permanent spark shield 20 attached to a welding foot 22 which is adjustably supported by two legs 24, as is well known in the art. A ceramic ferrule can be used in place of the spark shield 20 and for some applications, no shield or ferrule at all may be needed.

The chuck 18 is attached to a chuck connection or leg 26 which is threadedly engaged with a cable clamp 28 constituting an internal component of the tool 10. The clamp 28 is slidably supported in a forward portion of the body 12 which is closed off by a front end wall 30. Welding current is supplied to the cable clamp 28 through a flexible main welding cable 32 which applies welding current through the chuck leg 26 to the chuck 18 and the stud carried thereby.

Beyond the cable clamp 28 is a rear cable clamp part 34 which is suitably connected to a lift rod 36 having a guide rod 38 extending rearwardly through a movable core 40. A lifting hook 42 is attached to the movable core 40 and is positioned to engage a lifting ring 44 when moved rearwardly by the core 40. The ring 44 has an inner diameter exceeding the outer diameter of the lift rod 36 and the ring is maintained in a perpendicular position by a lifting ring spring 46 which urges the ring 44 against a stop plate 48 held in place by a return or plunge spring 50. In this position, the lift ring 44 is free of the lift rod 36 which can move therethrough so as to retract when the stud and the chuck are moved from an extended position to a slightly retracted, initial welding position when the stud is pressed against the workpiece. This initial welding position may vary slightly for variations in the length of the stud held by the chuck. When the lifting hook 42 engages the lifting ring 44, the ring moves to a canted position in which it engages the lifting rod 36 and retracts it to a fully retracted position when the core 40 moves toward the rear. In this manner, the stud will be retracted a predetermined distance even through its length may differ from the lengths of other studs.

The movable core 40 is retracted when current is supplied to a lifting and holding coil 52 through suitable leads 54. The rearward movement of the core 40, which determines the extent of the lift of the stud and the chuck 18, is limited by an adjustable core piece 56.

Figure 2:
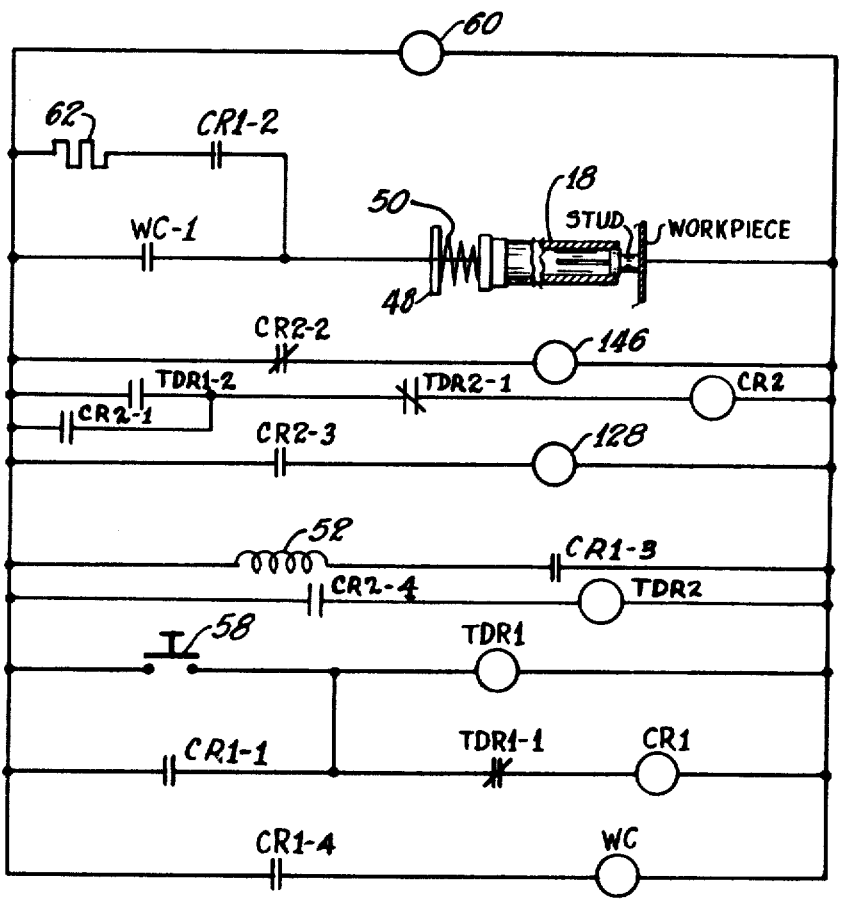
FIG. 2 is a diagrammatic view of an electrical circuit used to effect a stud-welding cycle.

The operation of the tool 10 is made possible with a suitable electrical control circuit such as that of FIG. 2. The stud is first pressed against the workpiece to move the stud and the chuck from the extended position to the slightly retracted or welding position. Then, a trigger 58 of the tool 10 is pressed to close contacts 59 to supply current from a suitable source such as a generator 60 through a time delay relay TDR1 which closes its contacts TDR1-1 and begins to time out, opening its contacts TDR1-1 at the end of a timing period.

Simultaneously with the actuation of the time delay relay, a circuit is completed through the contacts TDR1-1 to actuate a control relay CR1. When the control relay CR1 is actuated, it first closes normally open contacts CR1-1 which establish a temporary holding circuit for the relay CR1 if the trigger is released. The control relay CR1 also closes normally open contacts CR1-2 to close a pilot arc circuit including an impedance 62 which can be in the form of an inductance or resistance. A pilot arc thus is ready to be struck across the stud and the workpiece when the stud is retracted.

Substantially at the same time that the control relay CR1 closes its contacts CR1-2, it also closes normally open contacts CR1-3 to supply power to the lifting coil 52 and thereby fully retract the chuck 18 and the stud to establish the pilot arc. The control relay further closes normally open contacts CR1-4 to actuate a welding contactor WC which can be in the form of a heavy-duty relay which operates normally open contacts WC-1. When the contactor WC is actuated, it closes the contacts WC-1 to establish a welding arc across the pilot arc between the now-retracted stud and the workpiece. The welding contactor is designed to operate relatively slowly compared to the operation of the control relay CR1 with the result that the welding contacts WC-1 are not closed until the pilot arc has been established and the stud has been withdrawn from the welding position to the retracted position.

The main welding arc persists to form pools of molten metal on the stud and the workpiece until after the time delay relay TDR1 times out. Its contacts TDR1-1 then open to deenergize the control relay CR1. The various circuits are then broken by the control relay contacts CR1-1 to CR1-4 and the plunge spring 50 then forces the stud against the workpiece to unite the pools of molten metal and complete the weld. Although the welding contactor WC is deenergized when the relay TDR1 times out, it again moves relatively slowly so that the contacts WC-1 do not open until the plunge stroke of the stud is finished or almost finished. The welding arc thereby is not actually extinguished until approximately the time the stud contacts the workpiece to assure that the molten metal will not cool before the stud contacts the workpiece.

After the weld is completed, the tool 10 and the chuck 18 are pulled away from the now-welded stud. Before another welding cycle can commence, another one of the studs must be inserted in the chuck. Heretofore, the stud had to be grasped by the operator, oriented, aligned with the chuck, and finally inserted thereinto. This was time consuming, and particularly time consuming when small studs were employed. To overcome this problem and decrease overall welding time substantially, the present invention provides a means for quickly loading studs into the chuck from the rear of it. By loading the studs in the chuck from the rear, i.e. at a point between the chuck and the body 12 of the tool, the loading device or loader is never in the way of the chuck and the welding operation is unimpeded. Further, there is no necessity for moving the loading device into position and out of the way after and before each welding cycle.

Figure 3:
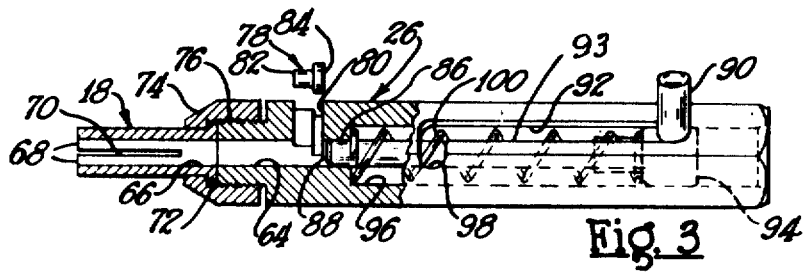
FIG. 3 is an enlarged view, with parts broken away and with parts in cross section, of a chuck and loading piston shown in FIG. 1.
Figure 4:
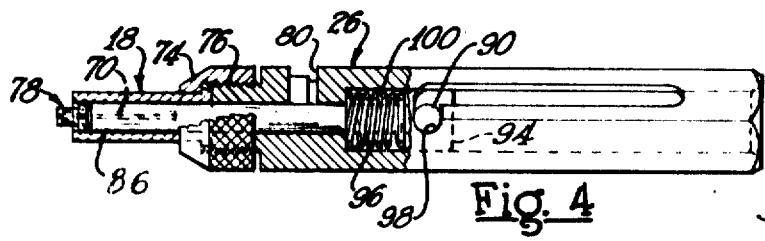
FIG. 4 is a view of the loading device of FIG. 3 in a different position, with a stud ready for welding.

A manually operated loading device employed with the tool 10 is shown in FIGS. 1, 3, and 4 and is incorporated in chuck means constituting the chuck 18 and the chuck leg or connection 26. Accordingly, a loading passage is formed by a loading passage extension 64 in the forward end of the chuck leg 26 and a loading passage 66 in the chuck 18, with the passage 66 extending completely through the chuck. The chuck 18 otherwise is substantially of standard design having resilient jaws or fingers 68 at the forward end formed by diametrically opposite slots 70 extending from the front end partially toward the rear end of the chuck 18. In this instance, the chuck 18 has a rear flange 72 by means of which it is mounted on the front end of the leg 26 by means of a shouldered nut 74 engaged on a forward threaded end 76 of the leg 26. The nut 74 can be removed to replace the chuck 18 if desired or when necessary.

Studs 78 can be loaded substantially perpendicularly into the passage 64 through an inlet opening 80 in the leg 26, the inlet opening 80 having a cross-sectional shape in a plane parallel to the axis of the passage 66 similar to a longitudinal cross section through the stud 78, to prevent it from cocking when fed into the opening 80. Although the stud 78 includes a stem 82 and a head 84, the diameter of which is substantially equal to the length of the stud, there is little tendency for the stud to cock and jam in the passages 64 and 66 when moved by a plunger or piston 86 to the chuck 18.

The studs 78 can be fed through the opening 80 into the loading passage 64 by a number of suitable means. As shown, for example, the stud 78 can be dropped in by hand and still be loaded faster than if they are inserted into the end of the chuck 18 by hand. However, the stud 78 can be fed to the passage 64 from a magazine or from a remote hopper having suitable controls for feeding the studs one at a time to the passage 64.

Regardless of the method of supplying the studs to the passage, once they are in position, the plunger 86 is moved forwardly to push the stud 78 from a position near the inlet 80 to a position in the jaws 68, as shown in FIG. 4, with the stem 82 protruding beyond the chuck 18. In this extended position of the stud and chuck, the stud 78 is held with its axis substantially coaxial with the axis of the passages 64 and 66 by virtue of a square or flat end 88 of the plunger 86 which abuts the stud head 84 and backs it up during the welding cycle. In this manner, the plunger end 88 limits the extent to which the stud can move into the recess and also holds the stud squarely.

The plunger 86 can be moved forwardly through the loading passage by a number of suitable means. As shown, the plunger 86 has a manually operable handle 90 extending outwardly through an L-shaped slot 92 in the chuck leg 26. The handle 90 is connected to the plunger 86 through a plunger rod 93 an enlarged drive member or head 94 which also serves to guide the rear of the plunger 86 in a cylinder 96. The handle 90 is moved forwardly in the slot 92 and, when at the forward end, is swung transversely into a notch 98 which holds the handle and maintains the plunger 86 in its forward position of FIG. 4 during a welding cycle. After welding, the tool and the chuck 18 are withdrawn from the stud 78 which is now welded to the workpiece. The frictional grip of the stud 78 by the chuck 18 enables the chuck to be pulled from the stud. At this time, the handle 90 can be moved out of the slot notch 98 at which time a compressed return spring 100 moves the handle 90 to the rear of the slot 92 and at the same time moves the plunger 86 to the rear of the passage 64 with the square end 88 just to the rear of the loading inlet 80. Another of the studs 78 can then be inserted in the inlet 80 and the handle 90 then moved forwardly once again to move the plunger 86 forwardly and push the stud 78 into the chuck with the stem 82 protruding beyond the fingers or jaws 68 of the chuck 18.

Figure 5:
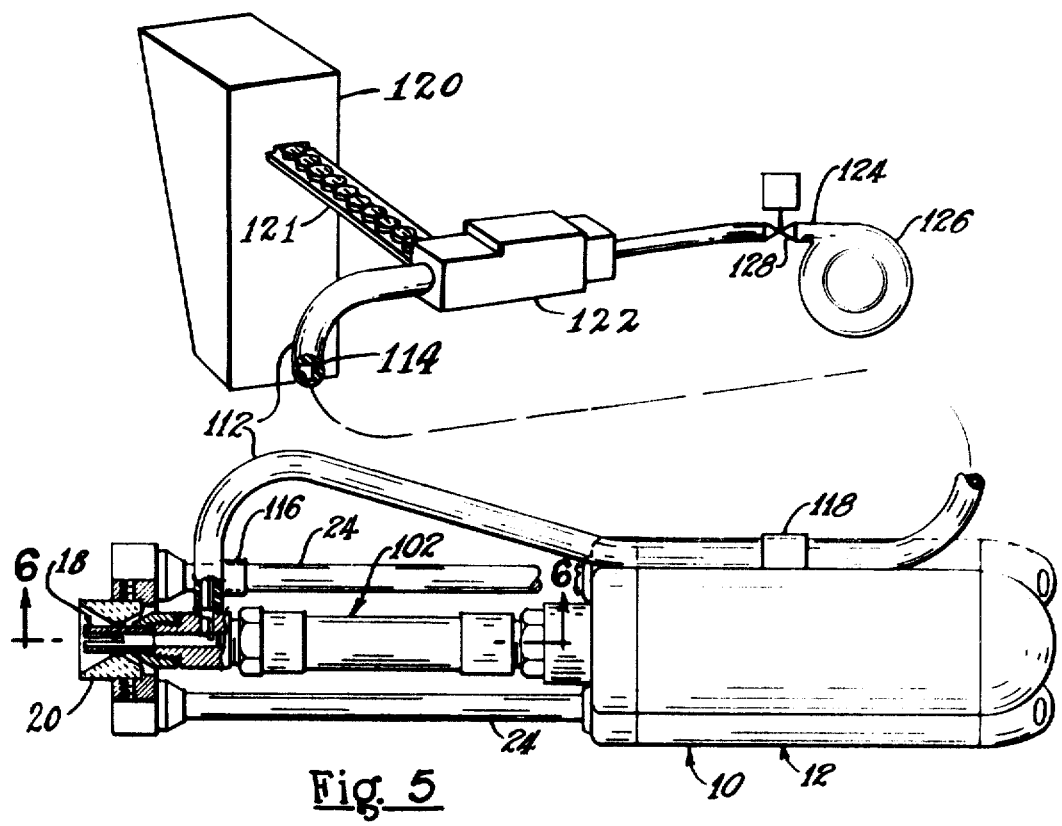
FIG. 5 is a top view of a stud-welding tool similar to that of FIG. 1, but with a pneumatically operated, modified loading device.
Figure 6:
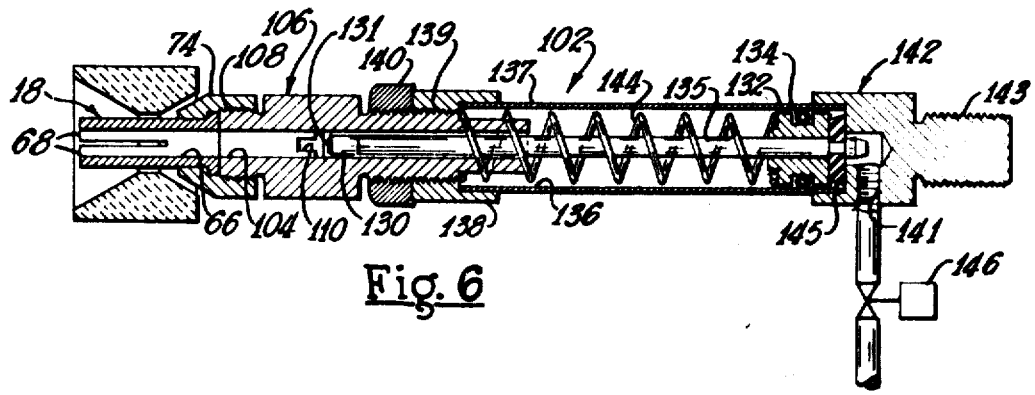
FIG. 6 is an enlarged view in longitudinal cross section taken along the line 6—6 of FIG. 5.

FIGS. 5 and 6 show a somewhat modified stud-loading device for the tool 10. The device in this instance differs from that of FIGS. 1, 3, and 4 in two aspects. The loading plunger is pneumatically operated rather than manually operated, while the studs are fed sequentially to the loading passage from a remote hopper through a flexible tube. Referring in more detail to FIGS. 5 and 6, a modified chuck leg or connection 102 is used in place of the chuck leg 26 but serves the same function, insofar as the overall tool is concerned, of connecting the chuck 18 with the internal components of the tool. A loading chamber or passage extension 104 is formed in this instance in a forward part 106 of the chuck leg 102 with the part 106 having a forward threaded end 108 to receive the nut 74 to align the loading passage 66 of the chuck 18 with the loading passage 104.

The studs 78 are again fed one at a time through an inlet 110 located at a rear portion of the passage 104. In this instance, the studs are fed to the loading passage 104 through a flexible tube 112 having a feed passage 114 therethrough which is similar in cross section to the longitudinal cross-sectional shape of the stud 78. This keeps the stud 78 effectively oriented throughout its travel through the tube 112. With the stud 78 deposited sideways through the inlet 110 into the passage 104, there is less chance for cocking and jamming than if the stud is fed endways into the passage 104 through an inlet which is slanted with respect to the axis of the passage. The tool end of the tube 112 is held by a suitable bracket 116 attached to one of the tool legs 24 and is spaced slightly from the inlet 110. By loosening the bracket 116 or by slipping the tube 112 out of it, the tube can be moved away from the inlet 110 to enable access to the inlet if a stud should jam. The bracket 116 holds the end of the tube in a position such as to be aligned with the stud inlet 110 of the loading passage 104 when the chuck leg 102 and the chuck 18 are in their normal, inoperative position with the tool 10 held apart from the workpiece. The tube 112 is spaced from the chuck leg 102 and specifically the forward part 106 thereof and remains stationary while the chuck leg is withdrawn and plunged during the welding cycle. In the withdrawn or retracted position, the inlet 110 is to the rear of the tube 112. The feed tube 112 can be curved rearwardly and an intermediate part thereof attached to the body 12 of the tool 10 by any suitable bracket 118.

The tube 112 then is extended to a remote point at which the studs 78 are fed through it sequentially by fluid power. The feed tube 112 can be even more than 25 feet in length so that the tool 10 can be moved around substantially unimpeded over a large area and never separated from the source of supply. For the purpose of supplying the studs 78 through the tube 112, the studs are first placed in an orienting hopper 120 which orients the studs 78 and feeds them down a track 121 to an escapement mechanism 122. At the proper time, an oriented stud in the escapement mechanism 122 receives a blast of air through an inlet tube 124 connected to a blower 126 or other suitable source of air with the air being controlled by a valve 128. The oriented stud thereby is blown through the passage 114, through an inlet 110, and into the loading passage 104. The hopper 120 and the track 121 can be of a type disclosed in Moore et al. U.S. Pat. No. 2,754,860. The escapement mechanism 122 can be similar to that of FIG. 8, to be discussed subsequently.

The stud is moved from the inlet 110 to the chuck jaws 68 by means of a stud plunger 130 having a squared end 131. In this instance, the plunger 130 is pneumatically driven by means of a pneumatic drive piston or member 132 having an O-ring seal 134, the piston 132 being connected to the plunger 130 through a piston rod 135. The pneumatic piston 132 reciprocates in an air cylinder 136 formed by a tubular member 137 which is suitably affixed to a threaded connector 138 screwed onto a threaded end 139 of the forward chuck leg part 106. The connector 138 is held in a fixed position with respect to the forward part 106 by means of a retaining nut 140. This arrangement for the chuck leg 102 enables the plunger 130 to be adjusted relative to the chuck 18 by turning the threaded connector 138 toward and away from the chuck thereby to change the forward and retracted positions of the plunger 130.

Air for the piston 132 is supplied through a suitable threaded opening 141 located in a rear chuck leg part 142 having a threaded shank 143 to engage the cable clamp 28 or other appropriate internal component of the tool 10. After the piston 132 is driven forwardly by pneumatic pressure and the pressure is released, the piston and the plunger 130 are retracted by means of a return spring 144 until a resilient stop 145 behind the piston 132 contacts the rear chuck leg part 142.

In the operation of the stud-loading device of FIGS. 5 and 6, after a stud-welding cycle is complete, the air to the cylinder 136 is shut off by means of a suitable valve 146 with the spring 144 then returning the piston 132 to the rear position. During the return stroke, the air in the rear of the cylinder 136 can be vented through a suitable bleed hole therein or by suitable venting provisions in the valve 146, as is well known. Either during or after retraction of the plunger 130 to the rear position, the air valve 128 is opened to feed the stud from the escapement mechanism 122 through the tube 112 and into the loading passage 104. The valve 128 is then closed and the valve 146 opened again to cause the piston 132 to move the plunger 130 forwardly and move the newly loaded stud into the end of the chuck 18, whereby another welding cycle can be commenced. The entire loading operation described above can take place in less than a second or so, whereby the loading time is a small fraction of that previously required.

The valves 128 and 146 can be automatically actuated, if desired. For this purpose, the valves can be solenoid controlled, being opened when the coils of the solenoids are energized and closed when deenergized. For automatic operation, the time delay relay TDR1 has a second set of contacts TDR1-2 which are open during the timing period and which close only momentarily after the welding operation is completed and the time delay relay TDR1 has timed out. The timing period for the relay TDR1 preferably is not only long enough to cover the welding cycle but also of sufficient extra length to enable the operator to withdraw the tool from the welded stud. The contacts TDR1-2 close only long enough to energize a second control relay CR2 which first closes its contacts CR2-1 to hold itself in. The control relay CR2 has a second set of contacts CR2-2 which normally energize the valve 146 to maintain the plunger 130 in the forward position. When the relay CR2 is energized and the contacts CR2-2 open, the valve 146 is closed to enable the spring 144 to return the plunger to its retracted position as long as the relay CR2 is energized. The relay CR2 also closes its contacts CR2-3 to open the valve 128 to feed a stud to the loading passage. Further, the relay CR2 closes its normally open contacts CR2-4 to energize a second time delay relay TDR2. When energized, the relay TDR2 times out and then temporarily opens its contacts TDR2-1 to drop out the relay CR2. The delay afforded by the relay TDR2 is sufficient to assure that a stud will be fed through the tube 112 to the chamber or passage 104. By simultaneously actuating the valves 128 and 146, the stud can be travelling through the tube 112 while the plunger 130 is retracting, to save time. If the stud arrives at the inlet 110 before the plunger 130 is fully retracted, it will be urged against the piston rod 135 and the plunger 130 by the air, finally being pushed into the chamber 104 after the piston clears the inlet. If it is desired to assure full retraction of the plunger 130 prior to feeding of the stud, a third time delay relay can be used to delay feeding the stud.

To briefly review the automatic operation of the valves, when the welding operation is completed and the relay TDR1 has timed out, the relay CR1 is deenergized and the relay CR2 is energized to open its contacts CR2-2 and retract the plunger 130. Another stud is then fed to the loading chamber or passage 104. At the same time, the timer TDR2 is energized to open its contacts TDR2-1 temporarily after a predetermined period. The relay CR2 is then deenergized to open the valve 146 and move the plunger 130 to the forward position where it remains until another welding cycle is completed. The valve 128 is also closed and remains so until another welding cycle is completed and another stud is to be loaded.

A slightly modified loader is shown in FIGS. 7–10. In this instance, the stud plunger is pneumatically operated the same as in the loader of FIGS. 5 and 6 but the studs are now supplied from a magazine rather than by hand or from a remotely located hopper. A magazine 147 is located in this instance above the tool 10 and basically includes a tubular stud holder 148 having an internal chamber 149 similar to the cross-sectional shape of the stud. To this extent, the tubular holder 148 is similar to the flexible tube 112 of FIG. 5 but preferably is stiffer. At the rear end of the tubular stud holder 148 is a sleeve 150 which protrudes beyond the end of the holder and forms a recess which receives a plunger 152 of a rear magazine support 154. The plunger 152 has an L-shaped passage 156 which is aligned with an air supply port 158 when pushed rearwardly by the holder 148. The plunger 152 also is urged outwardly by a spring 160 with the outward movement being limited by a resilient washer 162 located on a stem 164 at the opposite end of the plunger, with the washer abutting a shoulder 166 constituting part of a support housing 168. The rear support 154 has a flange 170 attached to the housing 168 which, in turn, is connected to a supporting ring 172 affixed to the tool 10 between the body 12 and the rear cap 16, as shown in FIG. 7. The forward end of the holder 148 is received in a front sleeve 174 held in a fixed position by a suitable bracket 176 which extends around the chuck leg 102 and is attached to the tool legs 24.

When the front end of the holder 148 is inserted into the sleeve 174, a stud stop 178 is raised to enable studs within the holder 148 to be moved forwardly into the sleeve. The stud stop 178 is attached to a leaf spring 180 having an upwardly slanted forward lip 182 and a rear mounting flange 184 which can be suitably attached to an upper surface of the holder 148 with the stud stop 178 extending into the passage 149 through a front notch 186. As the holder 148 is shoved forwardly into the sleeve 174, the lip 182 engages the edge of the sleeve and cams the stop 178 and the leaf spring 180 upwardly to free the stop from the passage 149. The stop 178 enables the magazine 147 to be handled with the forward end downwardly without danger of spilling the studs located therein.

The magazine 147 can be filled, after emptying, from any suitable one of several loading devices known in the art. If desired, a number of the magazines 147 can be located near the working station so that, as soon as one is emptied, another can be inserted without immediately filling the first. Also, the magazines can be purchased already filled with studs and then thrown away when empty. To place the magazine 147 in operative position, the rear sleeve 150 first is slid over the plunger 152 of the rear support 154, which is turned 90° in FIG. 10. The magazine is then pushed rearwardly against the force of the spring 160 to space the forward end of the magazine from the rear edge of the sleeve 174. The front end of the magazine 147 then is inserted into the sleeve 174 with the stop 178 moved clear of the passage 149. The spring 160 then holds the magazine 147 securely in place. At this time, the L-shaped passage 156 is aligned with the threaded opening 158 so that air can be supplied through the opening 158, through the passage 156, and then to the stud holder passage 149 to place pressure against the studs therein and to urge them toward the front portion of the welding tool 10. The air thereby simply acts as a spring but is preferred to a spring because of space considerations. If a spring were employed, it would extend appreciably beyond the rear of the tool 10 and tend to hamper the welding operation.

With the stud stop 178 raised, the studs are urged by the air pressure into an elongate, rigid member 188 to which the sleeve 174 is attached. The member 188 has a generally L-shaped feed passage 190 therein which carries the studs sequentially from the magazine to a feeding station designated 192 in FIG. 8, this station being at the opposite end of the rigid member 188. With the apparatus of FIG. 5, the station 192 is formed right side up with the studs fed to the station 192 by gravity down the track 121, in place of the rigid member 188. The stud at the station 192 is mechanically held therein by means of a spring-loaded detent 194 urged outwardly by a spring 196. From the station 192, the studs are fed one at a time through a feed tube 198 to the inlet 110 of the passage 104, the tube 198 having a feed passage 200 similar in transverse cross-sectional shape to the longitudinal cross-sectional shape of the stud. The stud is then moved forwardly to welding position by the plunger 130 in the same manner as in FIGS. 5 and 6. In FIG. 5, the studs are right side up so that the tube 112 must be twisted 180° before reaching the inlet 110.

When the studs are at the feeding station 192, they are controlled by an actuating mechanism 202 which is suitably affixed to the member 188 and held by the bracket 176. The actuating mechanism 202 includes an initiating plunger 204 having a drive piston 206 with an O-ring 208 and a plunger stem 210 which can extend through a short opening 212 in the member 188 and push the stud through a transverse exit opening 214 on the opposite side. The plunger piston 206 is located in an air cylinder 216 and can be moved forwardly by air supplied through a threaded inlet member 218. When the air supply is shut off, the plunger 204 is returned to the rear position by a return spring 220. The air is supplied through several longitudinal passages 221 in the member 218 and drives the piston 206 forwardly so that the stem 210 physically engages the stud at the feeding station 192 and mechanically forces it past the detent 194 and into the feed passage 200. By the time the plunger 204 moves the stud past the detent 194, a rear piston protrusion 222 has moved completely out of a recess 224 in the member 218 so that air supplied through the longitudinal passages 221 can enter a central plunger passage 226. This air is then blown down the feed passage 200 and moves the stud into the loading passage 104. Air for the initiating mechanism 202 can be controlled by the valve 128 of FIG. 5.

FIG. 11 shows a modified loading device in which mechanism means are used to feed studs one at a time from a supply source such as a magazine, for example, to a loading passage. In this instance, the studs 78 are fed through a rigid tube 228 having a passage shaped similarly in the longitudinal cross-sectional shape of the studs, with the studs fed by the magazine 147 of FIGS. 7-10 or by other suitable means. The studs are fed to a feeding station designated 232 by low-pressure air or by a spring as previously discussed. The rigid tube 228 is supported by a bracket 234 suitably attached to a welding foot 236 which is similar to the welding foot 22. The foot 236 also supports a sleeve 238 which slidably supports and guides a cylindrical connector 240 which connects a plunger pin 242 and a Z-shpaed transfer body 224. The body 244 has a short passage or chamber 246 therein which is large enough to receive a stud. A spring 247 presses against a washer 248 to urge the transfer body 244 and the pin 242 toward a forward position with the short passage 246 aligned with the inlet 110 for the loading passage 104. A second spring 249 enables the pin 242 to yield to irregularities in the work surface.

When the tool 10 is pressed against the workpiece to place the stud 78 and the spark shield 20 thereagainst, the pin 242 forces the transfer mechanism to a rear position in which the short passage 246 is aligned with the feed passage 228 and receives the next stud from the feed station 232. While the previous stud and spark shield are against the workpiece, the transfer body 244 remains in the rear position and the last stud remains in the short passage 246. When the previous stud is welded and the tool is withdrawn from the workpiece, the spring 248 again returns the transfer body 244 to the forward position until it abuts the end of the sleeve 238, at which time the short passage 246 is aligned with the inlet 110 and the stud in the transfer body drops to the loading passage 104. The stud is then moved into welding position by the pneumatically operated plunger 130 or the manually operated plunger 86. With the pneumatic plunger, the air supply for it can be controlled by the operation of the plunger pin 242, if desired, with air supplied to the plunger 130 whenever the pin 242 is in its rear or depressed position. If desired, the magazine can be used with a spring rather than air and the plunger 130 can be manually operated, in which case no air supply is needed at all for the tool.

Figure 12:
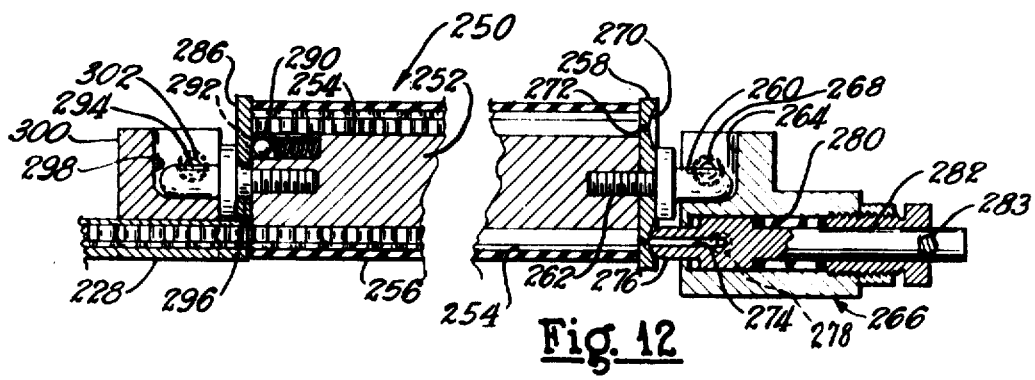
FIG. 12 is a fragmentary view in longitudinal, vertical cross section of a rotatable magazine which is a supply source of studs.
Figure 13:
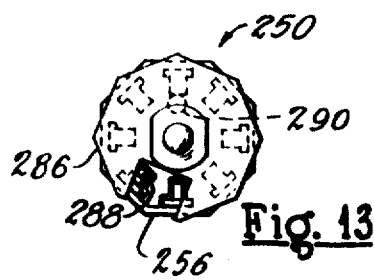
FIG. 13 is a view of the left end of the magazine shown in FIG. 12.
Figure 14:
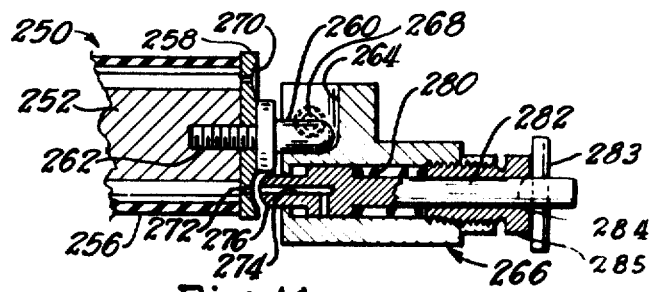
FIG. 14 is a fragmentary, cross-sectional view of part of the magazine or stud supply source shown in FIG. 12, with a part thereof shown in a different position.

FIGS. 12–14 show a modified magazine which can be used in place of the magazine 147. The magazine designated 250 includes a central rotatable stud holder or body 252 of extruded plastic or the like having a plurality of stud chambers or passages 254 circumferentially spaced, with cross-sectional shapes similar to the longitudinal cross-sectional shapes of the studs. A plastic sheath 256 is positioned around the body 252 to enclose the stud passages 254.

A stationary end wall 258 closes off the right end of the magazine body 252 and is affixed thereto by an axle 260 which has a threaded portion 262 turned into the end of the body 252. The axle 260 is supported in a recess 264 of a rear support 266 and is held therein by a spring-loaded detent 268. The rear support 266 can be supported by the tool 10 through brackets similar to those of FIG. 7, for example. The end wall 258 has a recess 270 and an air inlet 272 for each of the stud chambers or passages 254 through which air can be supplied to urge the studs toward the front end of the magazine. Air is admitted to the openings 272 through a centrally located passage 274 extending through a plunger 276. The passage 274 is L-shaped and communicates with a suitable threaded opening 278 in the support 266 through which air is supplied to the passage 274. The plunger 276 has a rounded end and is urged by a spring 280 into the recesses 270 when the magazine holder 252 is rotated. The plunger 276, due to its rounded end and the mating concave shape of the recess 270, acts as a locating detent which automatically aligns the central passage 274 with each of the air inlet openings 272 when brought into registry with the plunger 276. When the holder 252 is to be removed, the plunger 276 is turned 90° by means of a stem 282 and a handle 283 to shut off the air by disconnecting the threaded opening 278 and the central passage 274. When the handle 283 is turned, it also is cammed out of a transverse groove 284 in a threaded bushing 285 which guides the stem 282. This moves the plunger 276 rearwardly, separating it from the recess 270, thereby facilitating removal of the holder 252.

At the left end of the holder 252, a rotatable end wall 286 is provided, having an offset opening 288 which can be aligned with the various passages 254 as the studs are loaded therein from any suitable loader. When all of the chambers are filled, the opening 288 is moved to an offset position, as shown in FIG. 13, in which position the end wall is held by a detent 290 extending into a recess 292, the two being out of registry in FIG. 12. The end wall 286 is held by an axle 294 which is similar to the axle 260 except for having a bearing portion 296 which enables the end wall 286 to be rotatably supported relative to the holder 252. The axle 294 is held in a notch 298 of a left end support 300 which again can be supported by any suitable brackets such as those shown in FIG. 7. The axle 294 is held in the recess 298 by a suitable spring-loaded detent 302.

When the magazine 250 is in operating position, the opening or notch 288 is aligned with the end of the feed tube 228, or any other feed tube, which projects slightly beyond the support 300. The magazine is then lowered into place with the axles or pins 260 and 294 snapped into the recesses 264 and 298 of the supports 266 and 300 and with the notch 288 of the end wall 286 slipped over the end of the feed tube 228. The body 252 is then rotated until one of the recesses 270 is aligned with the plunger 276, after the plunger has been moved to its operating position by rotating 90° the handle 283. Air is then transmitted to the appropriate stud chamber 254 to supply studs through the opening 288 to the tube 228 and to the loading passage in the manner discussed previously.

Numerous modifications of the above-described embodiments of the invention will be apparent to those skilled in the art, and it it to be understood that such modifications can be made without departing from the scope of the invention, if they are within the spirit and the tenor of the accompanying claims.

I claim:

1. In a stud-welding tool for welding a stud to a workpiece, said tool comprising chuck means for holding a stud, means for retracting said chuck means, means for supplying welding current to the stud through said chuck means after being retracted, and means for plunging said chuck means forwardly toward the workpiece after being retracted, loading apparatus for loading studs in said chuck means comprising a loading passage extending rearwardly through the chuck means, a stud inlet extending transversely of said loading passage and communicating therewith for directing studs into said loading passage, said stud inlet moving with said chuck means, a loading plunger extending into said loading passage and having a retracted position to the rear of said inlet and a forward position for supporting a stud partly protruding from said chuck means during a welding operation, means behind said loading plunger for moving said plunger between the forward and retracted positions, stationary feed passage means for feeding studs through said inlet, said inlet being aligned with said feed passage means when said tool is spaced from the workpiece and said inlet being located rearwardly of said feed passage means when said chuck means is in the retracted position, a magazine carried by said tool for holding a plurality of studs in predetermined positions, means for feeding the studs through said feed passage means to said inlet, said moving means for said loading plunger comprising a handle and means connecting said handle and said plunger with said handle in a transverse position and extending away from said loading plunger to enable said plunger to be manually operated.